June 20, 1950  S. K. MOXNESS  2,512,364
PROCESS OF PREHEATING THERMOSETTING MATERIAL
IN STEAM AND MOLDING THE SAME
Filed Dec. 14, 1946

Inventor
SVEN K. MOXNESS

By George H. Fisher
Attorney

Patented June 20, 1950

2,512,364

UNITED STATES PATENT OFFICE 2,512,364

PROCESS OF PREHEATING THERMOSETTING MATERIAL IN STEAM AND MOLDING THE SAME

Sven K. Moxness, Richfield, Minn., assignor to Minneapolis-Honeywell Regulator Company, Minneapolis, Minn., a corporation of Delaware Application December 14, 1946, Serial No. 716,339

8 Claims. (Cl. 18—47.5)

This invention relates to the process of molding plastics, such as Bakelite, a phenolic condensation product, or urea and melamine materials and is more particularly concerned with that portion of the process which is commonly known as the preheating step.

In compression molding and, more particularly, transfer molding it is highly desirable that the molding powder be softened to some degree in order that the compression or transfer time is kept to a minimum by obviating the necessity of heating the powder in the molding apparatus.

The prior art methods of preheating have been somewhat unsatisfactory from the standpoint of equipment expense and in that the heating time in both the dry oven type of preheating arrangement, or by the much quicker but also quite more expensive electronic or induction heating, are both more critical as to the heating time. In both of these methods of preheating, excessive heating may cause precuring of the outer portion of the molding powder in the case of the dry oven preheating, and of the inner portion of the powder, in the case of electronic heating, which would result in imperfect molded articles. In each of the above types of preheating, it is readily apparent that even more moisture would be driven out of the commercial powdered material, which usually has been reduced to a moisture content of about 1 to 3½%. This removal of moisture from the molding powder has been the constant aim and recognized practice in the plastic molding art.

Contrary to the prior art ideas with respect to preheating, this invention lies in the preheating of plastic powder in an atmosphere of steam which has the dual function of preheating the material to its softening point and the addition of a small amount of moisture to relatively dry commercial molding material, or the extraction of moisture from relatively moist material, without causing precuring thereof.

One of the objects of this invention is to provide an inexpensive way of performing the required or desired preheating operation, both from the standpoint of apparatus and maintenance.

A further object of the invention is to so treat the molding material in its preheating step that a better curing of the molded article is obtained and the transfer time or molding time is reduced to a minimum.

Another object of the invention is to provide a preheating method that is not so critical as to the preheating time, thereby eliminating much of the spoilage of the molding material or of the molded article.

A still further object of the invention is to reduce the molding maintenance by so treating the molding material in the preheating step that wear and fouling of the mold is reduced due to the ability of using lower molding pressures than in conventional molding methods.

An additional object of the invention is to enable the manufacture of much less expensive molding material by permitting a less thorough drying of the material.

Still another object of the invention is to provide a method that will permit the preheating of large masses of molding material heretofore impractical.

Additional objects and advantages of the invention will become apparent upon reading the following detailed description of the invention, taken in connection with the accompanying drawing wherein.

The entire molding process may be considered as embodying three basic steps, namely, the measuring and segregating of uniform masses of the molding material, the preheating of said masses in an atmosphere of steam, and the molding of the said masses into an article in a suitable molding apparatus.

The first step may be performed by either weighing the commercial powdered molding material or by making volumetric measurements thereof, followed by the compression of said material into compact cakes, commonly known in the trade as preforms or tablets. It is to be understood, however, that the formation of the material into preforms is not essential to the process but is only desirable from the standpoint of handling, quicker preheating, and the shortening of the ram stroke in the molding apparatus. The moisture content of the powdered commercial molding material, of the phenolic condensation products type, usually varies from 1% to 3½%.

Figure 1:
Figure 1 is a diagrammatical showing of the basic process steps.
Figure 2:
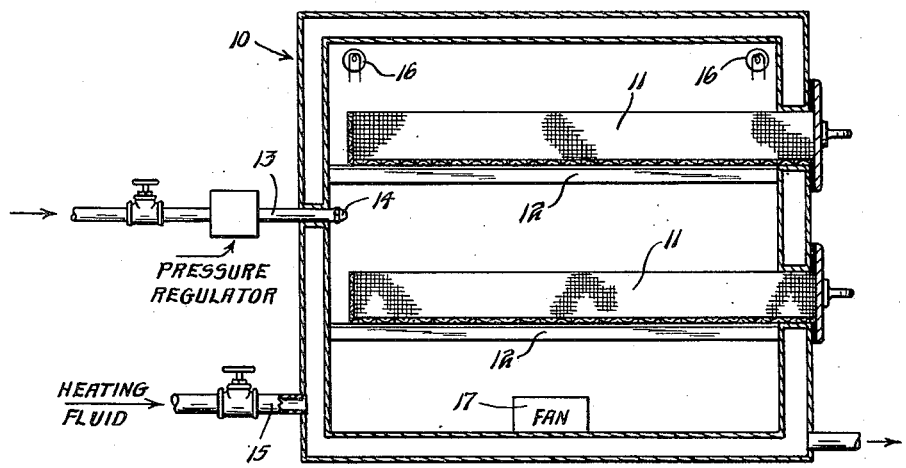
Figure 2 is a sectional view of one type of steam oven that may be used.

The second step is the primary concern of this invention. It comprises the placing of the preforms, for preheating in an atmosphere containing steam, into an apparatus such as that shown in Figure 2. This apparatus comprises an oven, generally designated by the reference numeral 10, wide-mesh, wire racks 11 slidably supported on wall rails 12, a pressure regulated steam supply pipe 13 extending through the wall of the oven and having a dispersion nozzle 14 thereon within the oven, and means 15 for supplying heat to the walls of the oven which means is illustrated as being a pipe for conducting heating fluid into the spaced wall sections of the oven. Instead of this last mentioned means, there obviously may be substituted electrical heating coils, or infrared lamps, or other types of heating means. Lamps 16 may be provided in the oven to aid in the observation of the preforms and to add heat thereto. A circulator 17, such as a fan, may also be provided to circulate the steam and heat.

By providing a sufficient number of the racks 11, it is apparent that after the initial molding operation has taken place, there will be no time delay for preheating the next charge of preforms for the next molding operation.

It is to be understood that suitable apparatus may be provided for automatically feeding the preforms into a suitably designed oven and from there into the molding apparatus.

While it has been found to be far from critical, the best results have been obtained in operating the oven at a temperature from 220° F. to 250° F. and at a low saturated steam pressure. The oven has been operated within a temperature range of 150° F. to 350° F. with high or low pressure steam, with satisfactory results.

In all of these experimental runs it was found that the softening temperature of the molding material tended to be lower with steam heating than in the prior art methods and that the transfer time or molding time was less in the steam heated preform runs, which was probably due to the lubricating effect of the added moisture, which usually varied from substantially 0 to 5% depending upon the commercial material used.

It is believed that the reason why the preforms do not absorb more moisture than they do, is due to the fact that the vapor pressure of the water within the preform and the vapor pressure of the moisture in the steam reaches a balance at the oven temperature. It is this same balancing action that causes material having an excessive moisture content to lose some of it in an identical preheating operation.

As to the better heating of the preforms in a steam atmosphere, it is believed that the steam has a penetrating effect that water does not have, which not only transfers moisture but also heat. The steam also provides a protective atmosphere over the outer surfaces of the preforms which prevents precuring of the outer surfaces even though the preforms are heated in this atmosphere for a comparatively long time. Preforms have been heated in an atmosphere of steam from 3 to 48 minutes without producing any appreciable difference in the molding process or in the molded articles. By making the preforms of small size, it is possible to condition the preforms for molding within a few seconds. It has also been found that the curing time tends to be less with steam heated preforms than dry heated preforms which is probably due to the shorter transfer time and to the moisture acting as a catalyst in the condensation polymerization reaction.

The third basic step of the molding process calls for the placing of the preheated molding material into a molding press of the transfer or jet or compression type and in forcing the material under pressure into the mold where it is allowed to cure. Transfer molding apparatus and methods are fully described in the United States patents, Numbers 1,916,495, 1,919,534, 1,993,942, and 1,997,074.

From the above description it can be seen that the applicant has invented a much more satisfactory and considerably less expensive method for preheating plastic materials in a molding process, which is totally different from prior art processes and which produces totally unexpected results in view of the prior art teachings.

It is to be understood that the apparatus shown and described herein is merely illustrative and that the scope of the invention is to be determined solely from the appended claims.

I claim:

1. The process of molding uncured powdered thermosetting material having a moisture content of from about 1% to about 3½%, which comprises measuring and compressing said uncured powdered thermosetting molding material into a preform, placing said preform into an atmosphere of steam, maintaining said preform in said atmosphere of steam for a period of time not substantially greater than that sufficient to bring said preform to its softening temperature, and then promptly molding said preform into an article of manufacture while it still retains substantially the temperature imparted to it by said atmosphere.

2. The process of molding uncured thermosetting molding material having a moisture content of from about 1% to about 3½%, which comprises placing the material in an atmosphere containing steam having a temperature above the steam condensation temperature thereby softening the material, removing said material from said atmosphere before it is cured, and then molding said material under pressure while it still retains substantially the temperature imparted to it by said atmosphere.

3. The method of molding uncured thermosetting molding material in the solid state which comprises placing said material in an atmosphere of steam at an elevated temperature above the condensation temperature of said steam thereby softening said material, removing said material from said atmosphere, and then molding said softened material under pressure while it still retains substantially the temperature imparted to it by said atmosphere.

4. The process of molding commercial uncured powdered thermosetting material having a moisture content of from 1% to 3½% which comprises measuring and compressing said material into a preform, placing said preform in an atmosphere of steam having a temperature above the condensation temperature of said steam, maintaining said preform in said atmosphere of steam for a period of time not substantially greater than that sufficient to bring said preform to its softening temperature, removing said material from said atmosphere, and then promptly molding said preform into an article of manufacture while it still retains substantially the temperature imparted to it by said atmosphere.

5. The method of molding uncured thermosetting molding material having a moisture content of from 1% to 3½%, which comprises placing the material in an atmosphere of steam, maintaining said material in said atmosphere at a temperature and for a time sufficient to soften but not cure said material and to adjust the moisture content thereof to a predetermined amount, and then promptly molding said preform under pressure while it still retains substantially the same temperature and moisture content imparted to it by said atmosphere.

6. The method of molding uncured thermosetting molding material in the solid state which comprises placing said material in an atmosphere of steam, maintaining said material in said atmosphere for a time not substantially greater than that necessary to soften it, removing said material from said atmosphere, and then molding said material under pressure while it still retains substantially the temperature imparted to it by said atmosphere.

7. The method of molding uncured thermosetting molding material in the solid state which comprises placing said material in an atmosphere of steam, maintaining said material in said atmosphere at a temperature and for a time sufficient to soften but not cure said material, removing said material from said atmosphere, and then molding said softened material under pressure while it still retains substantially the temperature imparted to it by said atmosphere.

8. The method of molding uncured thermosetting molding material in the solid state which comprises the steps of successively inserting at spaced intervals of time a plurality of measured quantities of said material in a heated enclosure having an atmosphere of steam, retaining each measured quantity of material in said enclosure until the same has reached a desired moisture content and a softening temperature, removing the first inserted of said measured quantities and placing the same while it still retains substantially the same temperature imparted to it by said atmosphere in a molding machine where it is subject to heat and pressure for causing the material to cure and replacing the measured quantity of the material removed from the enclosure by a similar quantity of the material, and then continuing the process by removing the next inserted of the measured quantities from the enclosure and molding it in the same manner as the preceding quantity was molded.

SVEN K. MOXNESS.

REFERENCES CITED

The following references are of record in the file of this patent:

UNITED STATES PATENTS

| Number | Name | Date |
|---|---|---|
| 1,471,906 | Langren | Oct. 23, 1923 |
| 1,758,946 | Grupe | May 20, 1930 |
| 2,016,568 | Zinser | Oct. 8, 1935 |
| 2,346,708 | Smidth | Apr. 18, 1944 |

FOREIGN PATENTS

| Number | Country | Date |
|---|---|---|
| 312,650 | Great Britain | May 29, 1929 |